(12) United States Patent
Freiman et al.

(10) Patent No.: US 10,630,336 B1
(45) Date of Patent: Apr. 21, 2020

(54) APPARATUS AND METHOD FOR OPERATING WITH A RADIO FREQUENCY CIRCUITRY AND WIRELESS TRANSMISSION AND RECEPTION IN A MILLIMETER WAVE RANGE

(71) Applicant: Intel Corporation, Santa Clara, CA (US)

(72) Inventors: Amit Freiman, Haifa (IL); Noam Kogan, Tel-Aviv (IL)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 16/205,269

(22) Filed: Nov. 30, 2018

(51) Int. Cl.
*H04B 1/40* (2015.01)
*H04L 25/03* (2006.01)

(52) U.S. Cl.
CPC ......... *H04B 1/40* (2013.01); *H04L 25/03828* (2013.01)

(58) Field of Classification Search
CPC  H03D 7/00; H03D 7/12; H03D 7/161; H03D 9/00; H03D 9/0633; H04B 1/04; H04B 1/0064; H04B 1/0458; H04B 1/0475; H04B 1/18; H04B 1/40; H04B 2001/0491; H04B 7/022; H04B 7/0697; H04B 7/08; H04W 52/146; H04W 52/24; H04W 52/325; H04W 52/346; H04W 72/0453; H04W 76/27; H04W 88/06
See application file for complete search history.

(56) References Cited

U.S. PATENT DOCUMENTS

2016/0248451 A1* 8/2016 Weissman ............ H04B 1/0064

* cited by examiner

*Primary Examiner* — Golam Sorowar
(74) *Attorney, Agent, or Firm* — 2SPL Patent Attorneys

(57) ABSTRACT

An apparatus for wireless transmissions and reception. The apparatus includes a radio frequency (RF) circuitry, a baseband circuitry, and a conversion circuitry. The RF circuitry is configured to transmit and receive a signal in an RF frequency. The baseband circuitry is configured to process a transmit signal or a receive signal in a baseband frequency. The conversion circuitry is configured to perform frequency conversion between the baseband and RF frequencies. The conversion circuitry is configured to convert a baseband signal received from the baseband circuitry to an RF signal in a first RF frequency if a transmit frequency is a second RF frequency or to the RF signal in the second RF frequency if the transmit frequency is the first RF frequency, and send the RF signal after frequency conversion to the RF circuitry. The RF circuitry converts the received RF signal to the transmit frequency for transmission.

17 Claims, 8 Drawing Sheets

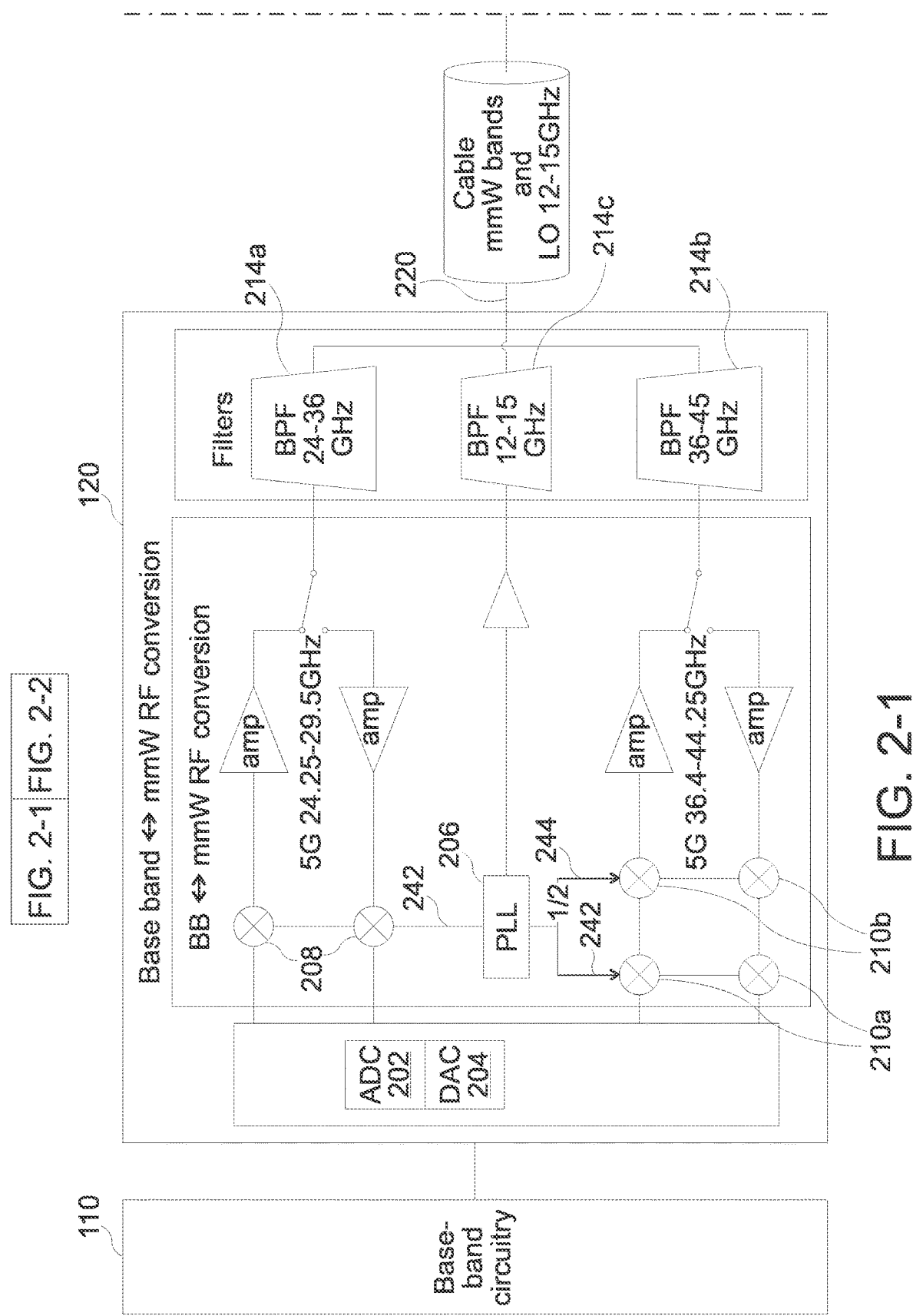

US 10,630,336 B1

APPARATUS AND METHOD FOR OPERATING WITH A RADIO FREQUENCY CIRCUITRY AND WIRELESS TRANSMISSION AND RECEPTION IN A MILLIMETER WAVE RANGE

FIELD

Examples relate to a wireless transceiver, more particularly an apparatus and method for operating with a radio frequency (RF) circuitry and wireless transmission and reception in a millimeter wave range.

BACKGROUND

Third Generation Partnership Project (3GPP) Fifth Generation (5G) wireless communication systems are being developed. Evolving 5G networks play a critical role to keep up with increasing demands for connectivity. In order to support the increased traffic demands and data throughput, 5G will extend the range of carrier frequencies to millimeter waves.

Devices supporting 5G (e.g. a user equipment (UE)) includes baseband (BB) circuitry (e.g. a baseband integrated circuit (IC) chip) and radio frequency (RF) circuitry (e.g. an RF IC chip). The RF circuitry is placed near the antenna (e.g. active antenna) of the device.

Interfacing between the baseband IC and the RF IC in a millimeter wave frequency instead of low intermediate frequency (IF) avoids the need for IF to RF conversion in the RF IC and vice versa. It provides various benefits for co-running with sub-7 GHz communication systems as well as regulatory conformance. However, this RF architecture can be sensitive to stability and oscillation since input and output frequencies to and from the RF IC are the same. In this case, when the leakage level from the antennas to the RF IC interfaces (towards the BB IC) is close to, or lower than, the gain of the RF IC (either in Rx or Tx) then the amplifiers within the RF IC will have positive feedback and become unstable. These strong leakages are very common and are difficult to mitigate with hardware solutions due to the small form factor of the antenna modules, the beamforming effect allowing for all leakages to combine coherently, and the nature of the millimeter wave frequencies.

BRIEF DESCRIPTION OF THE FIGURES

Some examples of apparatuses and/or methods will be described in the following by way of example only, and with reference to the accompanying figures, in which.

DETAILED DESCRIPTION

Figure 1:
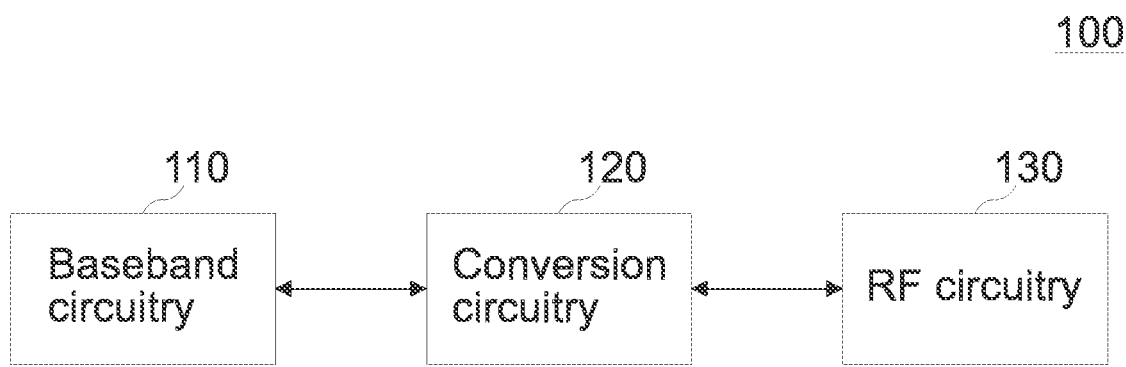
FIG. 1 is a block diagram of an exemplary apparatus in accordance with one example.

Various examples will now be described more fully with reference to the accompanying drawings in which some examples are illustrated. In the figures, the thicknesses of lines, layers and/or regions may be exaggerated for clarity.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Like numbers refer to like or similar elements throughout the description of the figures, which may be implemented identically or in modified form when compared to one another while providing for the same or a similar functionality.

It will be understood that when an element is referred to as being "connected" or "coupled" to another element, the elements may be directly connected or coupled or via one or more intervening elements. If two elements A and B are combined using an "or", this is to be understood to disclose all possible combinations, i.e. only A, only B as well as A and B. An alternative wording for the same combinations is "at least one of A and B". The same applies for combinations of more than 2 elements.

The terminology used herein for the purpose of describing particular examples is not intended to be limiting for further examples. Whenever a singular form such as "a," "an" and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises," "comprising," "includes" and/or "including," when used, specify the presence of the stated features, integers, steps, operations, processes, acts, elements and/or components, but do not preclude the presence or addition of one or more other features, integers, steps, operations, processes, acts, elements, components and/or any group thereof.

Unless otherwise defined, all terms (including technical and scientific terms) are used herein in their ordinary meaning of the art to which the examples belong.

Conventional RF architectures in a transceiver use IF to RF conversion in the RFH to prevent oscillations and guarantee stability since input frequency is substantially different from the output frequency of the RFH. RF architectures using low IF to RF conversion (e.g. conversion from 13 GHz to 5G mmWave bands of 24 to 30 GHz or 37 to 43.5 GHz) can be vulnerable to co-running with sub-7 GHz communication systems such as Long Term Evolution (LTE), Bluetooth, and wireless local area network (WLAN). The low IF resides in the vicinity of those IF frequencies or their second and third harmonics which can be difficult to filter out. For example, selecting IF frequency at 8 GHz is only 2 GHz away from the WLAN channels at 6 GHz and less than 1 GHz away from the new 5G channels up to 7.125 GHz. During co-running of the mmWave system with the WLAN or 5G sub-7 GHz system, these sub-7 GHz channels will leak into the cable at the same levels as the mmWave IF and would need to be filtered by as much as 60 dB. Otherwise, during the up-conversion from IF to RF, these interferences will be transmitted on air together with the desired mmWave signals at the same offset of 1-2 GHz and will fail regulatory compliance. Moreover, it prevents sharing multiple RF bands on a single cable such as having multiple mmWave bands of 24.25-29.5 GHz and 37-43.5 GHz that could be shared with 60 GHz WiGig. Some of these architectures also require phase locked loops (PLLs) in the RF IC which is not desirable due to temporary frequency instabilities (e.g. voltage-controlled oscillator (VCO) shifts) caused by transmit/receive transitions drawing high current in the vicinity of the PLL.

Examples are disclosed for an RF architecture that utilizes an RF frequency (e.g. 5G millimeter wave frequency) as the interface to the RFH via a single wire without IF to RF conversion. This improves co-running performance with the sub-7 GHz communication systems and is more resilient to unwanted and unexpected emissions that may fail the RF regulatory conformance.

Hereinafter, the examples will be explained with reference to a 5G system utilizing millimeter wave frequencies. However, it should be noted that the examples are not limited to the 5G systems and may be applicable to any systems configured to operate in any RF frequency ranges in or lower than the millimeter wave frequencies.

FIG. 1 is a block diagram of an exemplary apparatus 100 in accordance with one embodiment of the invention. The apparatus 100 includes a baseband circuitry 110, a conversion circuitry 120, and an RF circuitry 130. The RF circuitry 130 is configured to transmit and receive a signal via an antenna (not shown) in an RF frequency. The baseband circuitry 110 is configured to process a transmit signal or a receive signal in a baseband frequency. The conversion circuitry 120 is configured to interface between the baseband circuitry 110 and the RF circuitry 130, and perform frequency conversion for signals between the baseband frequency and the RF frequency.

The conversion circuitry 120 is configured to convert a baseband signal from the baseband circuitry 110 to an RF signal in a first RF frequency if a transmit frequency is a second RF frequency or to the RF signal in the second RF frequency if the transmit frequency is the first RF frequency. The transmit frequency is the frequency that the RF circuitry 130 is configured to use for transmission. The conversion circuitry 120 provides the RF signal after frequency conversion to the RF circuitry 130.

The RF circuitry 130 is configured to convert the RF signal received from the conversion circuitry 120 to the transmit frequency. The RF circuitry 130 is configured to convert the RF signal in the second RF frequency to the RF signal in the first frequency for transmission and convert the RF signal in the first RF frequency to the RF signal in the second frequency for transmission. The RF circuitry 130 may be configured to perform the conversion and transmission processing simultaneously and/or concurrently.

The conversion circuitry 120 may include a local oscillator circuitry configured to generate a local oscillator (LO) signal for frequency up or down conversion. The local oscillator circuitry may be configured to generate a local oscillator signal in a frequency that is a difference between the first RF frequency and the second RF frequency, and the conversion circuitry 120 is configured to send the local oscillator signal in the difference frequency to the RF circuitry 130.

For the receive processing, the RF circuitry 130 is configured to convert a received RF signal via an antenna to an RF signal in the second RF frequency if a receive frequency is the first RF frequency or to an RF signal in the first RF frequency if the receive frequency is the second RF frequency. The receive frequency is the frequency that the RF circuitry 130 is configured to use for reception. The RF circuitry 130 sends the received RF signal after frequency conversion to the conversion circuitry 120. The RF circuitry 130 may be configured to perform the conversion and reception processing simultaneously and/or concurrently. The conversion circuitry 120 down-converts the received RF signal and may convert it to a digital signal, and then send to the baseband circuitry 110.

In examples, the interface to the RF circuitry (e.g. RFH) may be in a 5G band (e.g. a mmWave band). In examples, instead of using the RF frequency band that will be transmitted or received on air via the antennas (e.g. the 5G band that the apparatus 100 is configured for transmission and reception), an alternate RF frequency band (e.g. another 5G band that the apparatus 100 is capable of using for transmission and reception) may be used for the interface to and from the RF circuitry 130. For example, the apparatus 100 may be configured to transmit or receive in two (or more) separate bands, e.g. the 24.25-29.5 GHz band and the 37.01-43.5 GHz band. When the apparatus 100 is to transmit or receive in the 24.25-29.5 GHz band, the 37.01-43.5 GHz band may be used to interface with the RF circuitry 130, and when the apparatus 100 is to transmit or receive in the 37.01-43.5 GHz band, the 24.25-29.5 GHz band may be used to interface with the RF circuitry 130.

It should be noted that the frequency bands described herein are provided as an example, not as a limitation, and the examples are applicable to any other frequency bands and the bandwidth of the frequency bands may be expanded or reduced. It should also be noted that the reference to mmWave is just an example and the examples disclosed herein may be applied to frequency bands other than the mmWave bands. The examples are applicable for the frequency bands that are currently defined by the 3GPP standards or that may be defined in the future. The apparatus 100 may cover one or more frequency bands defined by the 3GPP standards with a single RF chain. For example, the apparatus 100 may implement the examples disclosed herein to a frequency band covering 26.5-29.5 GHz, 24.25-27.5 GHz, and 27.5-28 GHz and a frequency band covering 37-40 GHz, and 40-43.5 GHz with a single RF chain.

Using an alternate RF frequency band (different from the transmit/receive frequency) for interfacing with the RF circuitry 130 improves co-running performance with the sub-7 GHz communication systems and is more resilient to unwanted and unexpected emissions that can fail the RF regulatory conformance.

Figure 2:
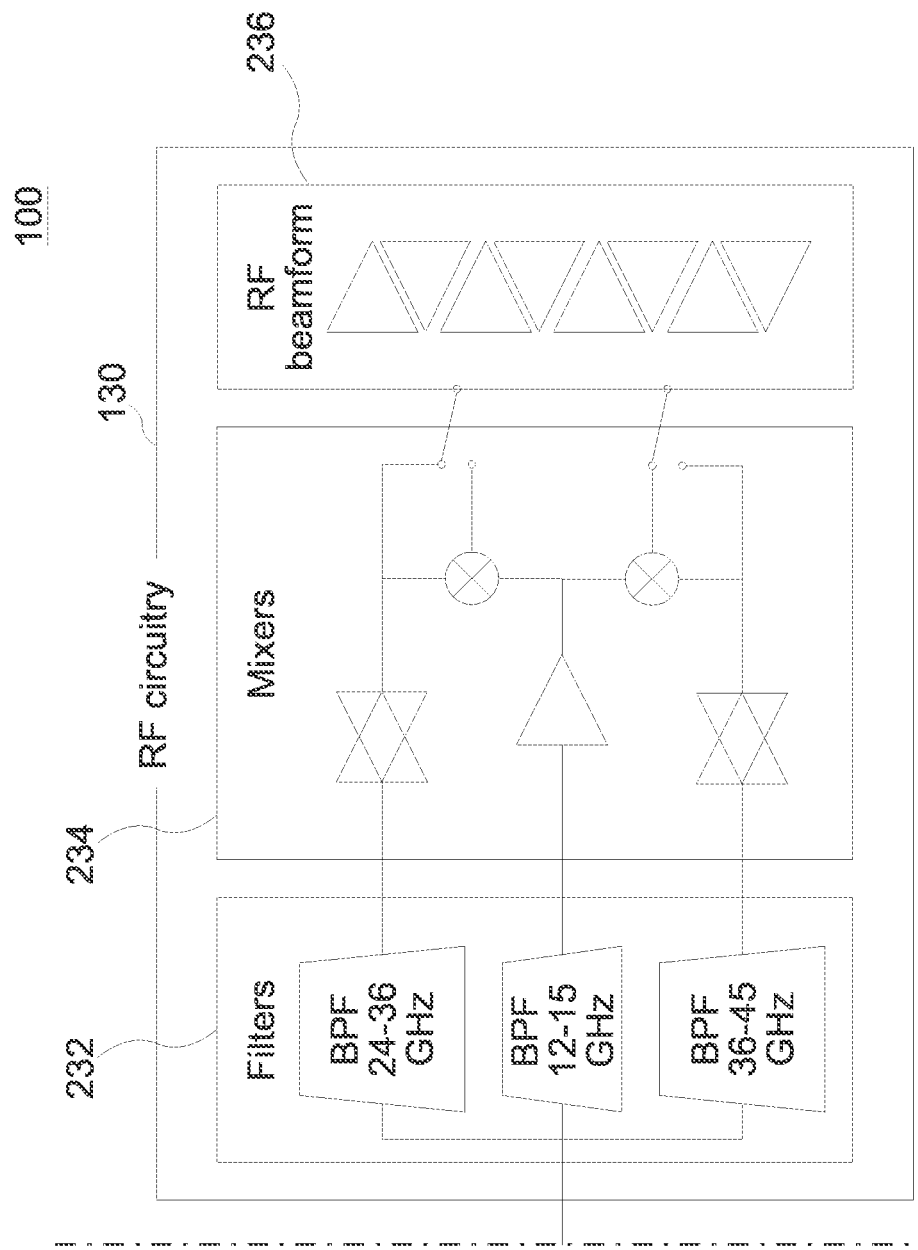
FIG. 2 shows an example structure of an apparatus in accordance with one example.

FIG. 2 shows an example structure of an apparatus 100 (e.g. a UE) in accordance with one example. The apparatus 100 includes a baseband circuitry 110, a conversion circuitry 120, and an RF circuitry 130. The baseband circuitry 110 and the conversion circuitry 120 may be installed on a motherboard of a wireless communication device, such as a UE, and the RF circuitry 130 may be placed near an antenna(s). The baseband circuitry 110, the conversion circuitry 120, and the RF circuitry 130 may be separate IC chips. Alternatively, the baseband circuitry 110 and the conversion circuitry 120 may be integrated into a single IC chip. The RF circuitry 130 and the baseband circuitry 110 interface via the conversion circuitry 120. In one example, the conversion circuitry 120 and the RF circuitry 130 may be connected via a single wire (conductor, e.g. operatively insulated conductor) 220 and RF signals for all applications running in the apparatus 100 may be multiplexed onto the single wire 220 between the conversion circuitry 120 and the RF circuitry 130. Alternatively, the conversion circuitry 120 and the RF circuitry 130 may be connected via several wires.

The conversion circuitry 120 interfaces between the baseband circuitry 110 and the RF circuitry 130. The RF circuitry 130 and the conversion circuitry 120 may interface each other in a 5G band (i.e. mmWave frequency), and the baseband circuitry 110 and the conversion circuitry 120 may interface each other in a baseband frequency. The apparatus 100 may be configured to transmit and/or receive in two (or more) separate bands (e.g. 24.25-29.5 GHz band and 37.01-43.5 GHz band). The apparatus 100 may be configured to transmit and/or receive in one of the two (or more) bands at a given time, or alternatively in two (or more) bands simultaneously.

For transmission, a baseband signal (e.g. a digital signal) processed by the baseband circuitry 110 is sent to the conversion circuitry 120. In the conversion circuitry 120, the digital signal received from the baseband circuitry 110 is converted to an analog signal by the digital-to-analog converter (DAC) 204. The analog signal is then up-converted to an RF signal by mixing the analog signal with a local oscillator signal generated by a PLL 206.

In one example, the conversion circuitry 120 may convert the analog signal to an RF signal in a first RF frequency if a transmit frequency is a second RF frequency and to the RF signal in the second RF frequency if the transmit frequency is the first RF frequency. For example, if the transmit frequency (from the RF circuitry 130) is 24 GHz, the conversion circuitry 120 may convert the analog signal to 36 GHz, and if the transmit frequency is 36 GHz, the conversion circuitry 120 may convert the analog signal to 24 GHz.

The conversion circuitry 120 may include multiple sets of mixers for up- or down-conversion. For example, the apparatus 100 may be capable of operating in two 5G bands, (e.g. 24.25-29.5 GHz band and 37.01-43.5 GHz band) and the conversion circuitry 120 may include a first set of mixers 208 for 24.25-29.5 GHz band and a second set of mixers 210a, 210b for 37.01-43.5 GHz band. The PLL 206 may generate an LO signal that may be used for both bands. For example, the PLL 206 may generate a first LO signal 242 for 24.25-29.5 GHz band, which is used in both the first set of mixers 208 and the second set of mixers 210a. The up- and down-conversion in the second set of mixers 210a, 210b may be performed in two stages such that the input signal is mixed with the first LO signal 242 in the first stage mixer 210a and the output from the first stage mixer 210a is mixed again with a second LO signal 244 in half the frequency of the first LO signal 242 in the second stage mixer 210b.

The up-converted RF signal is amplified by an amplifier and filtered by a filter. The conversion circuitry 120 may include multiple filters 214a-214c, one filter 214a, 214b for each transmit band (e.g. one for 24.25-29.5 GHz band and another for 37.01-43.5 GHz band) and another filter 214c for filtering the oscillator signal.

The conversion circuitry 120 is configured to send an LO signal to the RF circuitry 130 in a frequency that is a difference between the two transmit bands, i.e. the difference between the transmit frequency and the up-converted frequency. In examples, the conversion circuitry 120 may send the second LO signal 244 which is in half the frequency of the first LO signal 242 (e.g. 12 GHz in the above example). For example, the pass band of the filter 214c for the LO signal may be 12-15 GHz. After filtering, the up-converted RF signal and the LO signal in a difference frequency between the transmit frequency and the up-converted frequency may be multiplexed onto a single wire (conductor, e.g. operatively insulated conductor) 220 to the RF circuitry 130.

The RF circuitry 130 is configured to transmit and receive a signal in an RF frequency. In the RF circuitry 130, the RF signal received from the conversion circuitry 120 is filtered by filters 232. The RF circuitry 130 includes several filters 232 for different passband ranges such that the transmit signal and the LO signal multiplexed on the single wire 220 can be separated.

In the RF circuitry 130, the RF signal received from the conversion circuitry 120 is then converted by a mixer 234 to the transmit frequency by mixing the received RF signal with the LO signal received from the conversion circuitry 120. For example, if the RF signal received from the conversion circuitry 120 is in 24 GHz, the RF circuitry 130 converts the signal to 36 GHz by mixing the received RF signal with the received LO signal, and if the received RF signal frequency is 36 GHz, the RF circuitry 130 converts the RF signal to 24 GHz by mixing the received RF signal with the received LO signal.

The apparatus 100 may include multiple antennas (not shown) and the RF circuitry 130 may include an RF beamforming unit 236 for beamforming or multi-antenna transmission/reception, such as multiple-input multiple-output (MIMO), etc. The RF beamforming process may include splitting and combining of the signals, phase shifting, and/or amplification, etc.

For receive processing, the frequency conversion is performed in the RF circuitry 130 before sending the received RF signal to the conversion circuitry 120. The received RF signal via the antenna is sent to the conversion circuitry 120 in another frequency band different from the receive frequency. The RF circuitry 130 converts the received RF signal to another RF band by mixing the received RF signal with the LO signal supplied by the conversion circuitry 120. For example, if the received RF signal is in 24 GHz, the RF circuitry 130 may convert the received RF signal to 36 GHz by mixing the received RF signal with the LO signal received from the conversion circuitry 120, and if the received RF signal is in 36 GHz, the RF circuitry 130 may convert the RF signal to 24 GHz by mixing the received RF signal with the received LO signal.

In the conversion circuitry 120, the received RF signal from the RF circuitry 130 is filtered by filters 214a, 214b and then down-converted to a baseband frequency by a mixer 208, 210a, 210b. The baseband signal is converted to a digital signal by an analog-to-digital converter (ADC) 202, and then sent to the baseband circuitry 110 for further processing.

Figure 3:
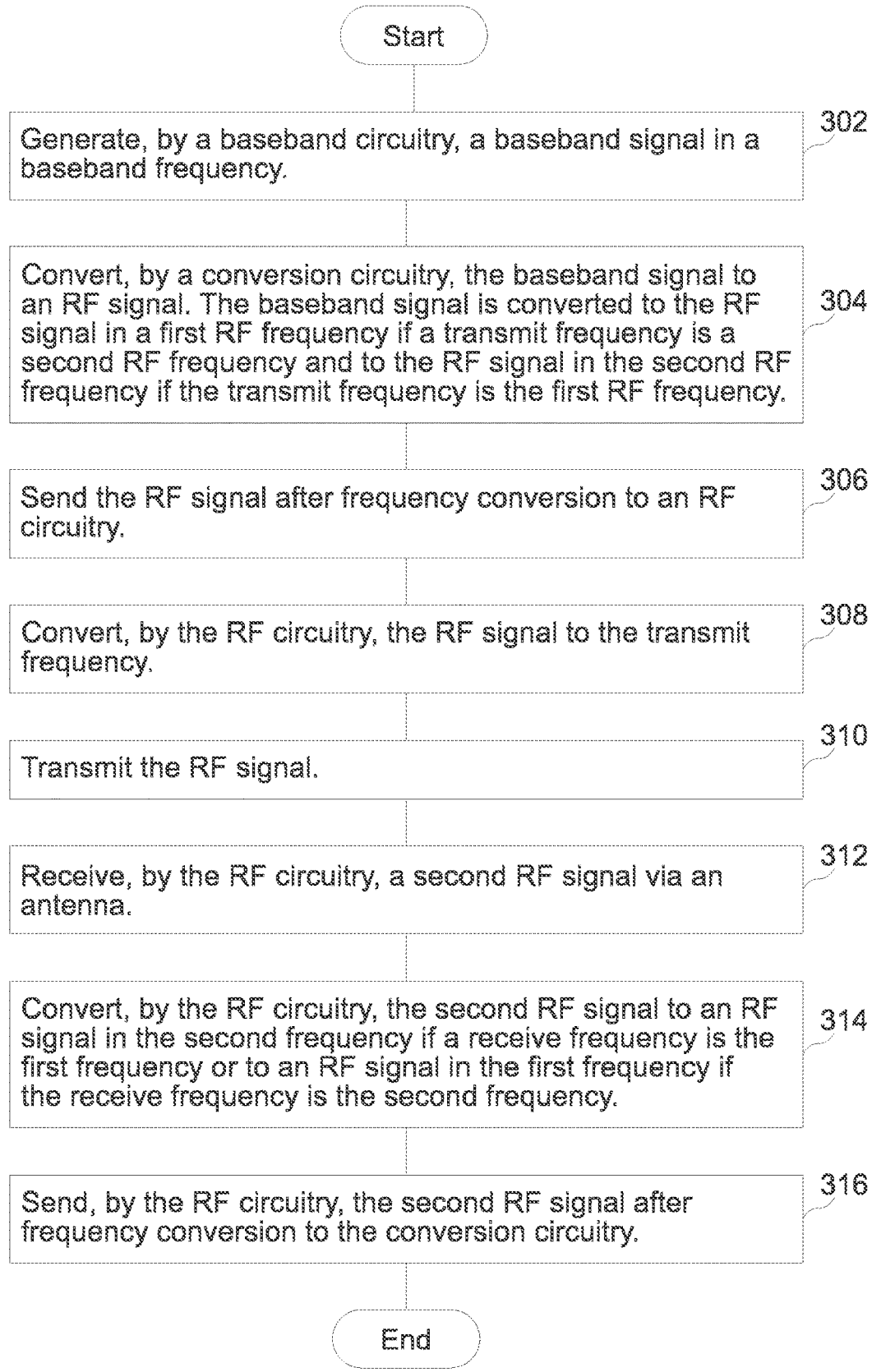
FIG. 3 is a flow diagram of an exemplary process for transmitting a signal in accordance with one example.

FIG. 3 is a flow diagram of an exemplary process for transmitting a signal in accordance with one example. A baseband signal is generated by a baseband circuitry 110 in a baseband frequency (302). The baseband signal is converted to an RF signal by the conversion circuitry 120 (304). The baseband signal is converted to the RF signal in a first RF frequency if a transmit frequency is a second RF frequency and to the RF signal in the second RF frequency if the transmit frequency is the first RF frequency. The RF signal after frequency conversion is sent to an RF circuitry 130 (306). The RF signal is then converted by the RF circuitry 130 to the transmit frequency (308). The RF signal in the transmit frequency is transmitted over the air (310).

For reception, the RF circuitry receives a second RF signal via an antenna (312). The RF circuitry converts the second RF signal to an RF signal in the second RF frequency if a receive frequency is the first RF frequency or to an RF signal in the first RF frequency if the receive frequency is the second RF frequency (314). The RF circuitry then sends the second RF signal after frequency conversion to the conversion circuitry (316).

Figure 4:
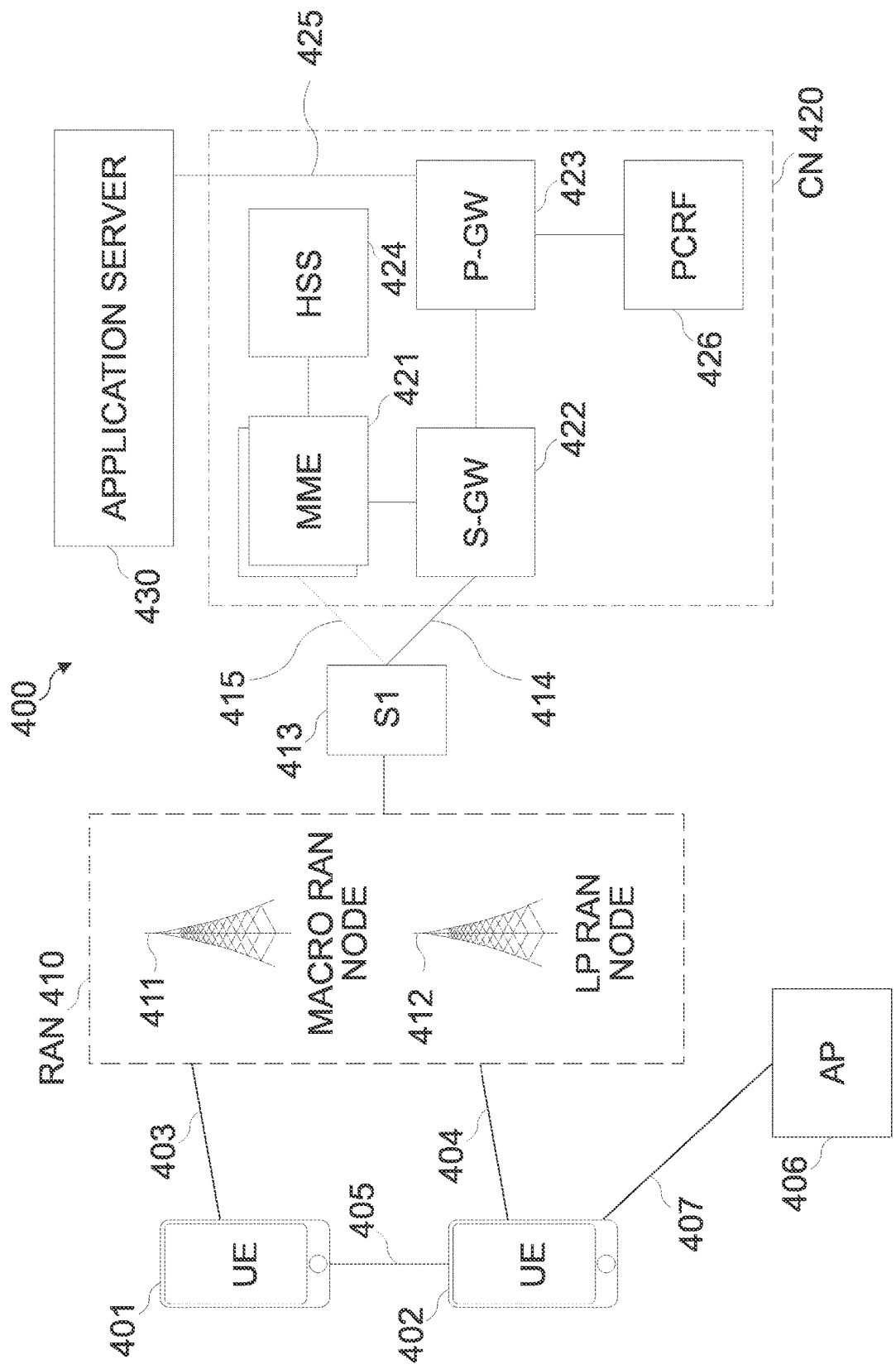
FIG. 4 illustrates an architecture of an exemplary system of a network in accordance with some embodiments.

FIG. 4 illustrates an architecture of an exemplary system 400 of a network in accordance with some embodiments. The system 400 is shown to include a user equipment (UE) 401 and a UE 402. The UEs 401 and 402 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 401 and 402 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 401 and 402 may be configured to connect, e.g., communicatively couple, with a radio access network (RAN) 410—the RAN 410 may be, for example, an Evolved Universal Mobile Telecommunications System (UMTS) Terrestrial Radio Access Network (E-UTRAN), a NextGen RAN (NG RAN), or some other type of RAN. The UEs 401 and 402 utilize connections 403 and 404, respectively, each of which comprises a physical communications interface or layer (discussed in further detail below); in this example, the connections 403 and 404 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 401 and 402 may further directly exchange communication data via a ProSe interface 405. The ProSe interface 405 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 402 is shown to be configured to access an access point (AP) 406 via connection 407. The connection 407 can comprise a local wireless connection, such as a connection consistent with any IEEE 802.11 protocol, wherein the AP 406 would comprise a wireless fidelity (WiFi®) router. In this example, the AP 406 is shown to be connected to the Internet without connecting to the core network of the wireless system (described in further detail below).

The RAN 410 can include one or more access nodes that enable the connections 403 and 404. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 410 may include one or more RAN nodes for providing macrocells, e.g., macro RAN node 411, and one or more RAN nodes for providing femtocells or picocells (e.g., cells having smaller coverage areas, smaller user capacity, or higher bandwidth compared to macrocells), e.g., low power (LP) RAN node 412.

Any of the RAN nodes 411 and 412 can terminate the air interface protocol and can be the first point of contact for the UEs 401 and 402. In some embodiments, any of the RAN nodes 411 and 412 can fulfill various logical functions for the RAN 410 including, but not limited to, radio network controller (RNC) functions such as radio bearer management, uplink and downlink dynamic radio resource management and data packet scheduling, and mobility management.

In accordance with some embodiments, the UEs 401 and 402 can be configured to communicate using Orthogonal Frequency-Division Multiplexing (OFDM) communication signals with each other or with any of the RAN nodes 411 and 412 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 411 and 412 to the UEs 401 and 402, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 401 and 402. The physical downlink control channel (PDCCH) may carry information about the transport format and resource allocations related to the PDSCH channel, among other things. It may also inform the UEs 401 and 402 about the transport format, resource allocation, and H-ARQ (Hybrid Automatic Repeat Request) information related to the uplink shared channel. Typically, downlink scheduling (assigning control and shared channel resource blocks to the UE 102 within a cell) may be performed at any of the RAN nodes 411 and 412 based on channel quality information fed back from any of the UEs 401 and 402. The downlink resource assignment information may be sent on the PDCCH used for (e.g., assigned to) each of the UEs 401 and 402.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as an enhanced resource element groups (EREGs). An ECCE may have other numbers of EREGs in some situations.

The RAN 410 is shown to be communicatively coupled to a core network (CN) 420—via an S1 interface 413. In embodiments, the CN 420 may be an evolved packet core (EPC) network, a NextGen Packet Core (NPC) network, or some other type of CN. In this embodiment the S1 interface 413 is split into two parts: the S1-U interface 414, which carries traffic data between the RAN nodes 411 and 412 and the serving gateway (S-GW) 422, and the S1-mobility management entity (MME) interface 415, which is a signaling interface between the RAN nodes 411 and 412 and MMEs 421.

In this embodiment, the CN 420 comprises the MMEs 421, the S-GW 422, the Packet Data Network (PDN) Gateway (P-GW) 423, and a home subscriber server (HSS) 424. The MMEs 421 may be similar in function to the control plane of legacy Serving General Packet Radio Service (GPRS) Support Nodes (SGSN). The MMEs 421 may manage mobility aspects in access such as gateway selection and tracking area list management. The HSS 424 may comprise a database for network users, including subscription-related information to support the network entities' handling of communication sessions. The CN 420 may comprise one or several HSSs 424, depending on the number of mobile subscribers, on the capacity of the equipment, on the organization of the network, etc. For example, the HSS 424 can provide support for routing/roaming, authentication, authorization, naming/addressing resolution, location dependencies, etc.

The S-GW 422 may terminate the S1 interface 413 towards the RAN 410, and routes data packets between the RAN 410 and the CN 420. In addition, the S-GW 422 may be a local mobility anchor point for inter-RAN node handovers and also may provide an anchor for inter-3GPP mobility. Other responsibilities may include lawful intercept, charging, and some policy enforcement.

The P-GW 423 may terminate an SGi interface toward a PDN. The P-GW 423 may route data packets between the EPC network 423 and external networks such as a network including the application server 430 (alternatively referred to as application function (AF)) via an Internet Protocol (IP) interface 425. Generally, the application server 430 may be an element offering applications that use IP bearer resources with the core network (e.g., UMTS Packet Services (PS) domain, LTE PS data services, etc.). In this embodiment, the P-GW 423 is shown to be communicatively coupled to an application server 430 via an IP communications interface 425. The application server 430 can also be configured to support one or more communication services (e.g., Voice-over-Internet Protocol (VoIP) sessions, PTT sessions, group communication sessions, social networking services, etc.) for the UEs 401 and 402 via the CN 420.

The P-GW 423 may further be a node for policy enforcement and charging data collection. Policy and Charging Enforcement Function (PCRF) 426 is the policy and charging control element of the CN 420. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 426 may be communicatively coupled to the application server 430 via the P-GW 423. The application server 430 may signal the PCRF 426 to indicate a new service flow and select the appropriate Quality of Service (QoS) and charging parameters. The PCRF 426 may provision this rule into a Policy and Charging Enforcement Function (PCEF) (not shown) with the appropriate traffic flow template (TFT) and QoS class of identifier (QCI), which commences the QoS and charging as specified by the application server 430.

Figure 5:
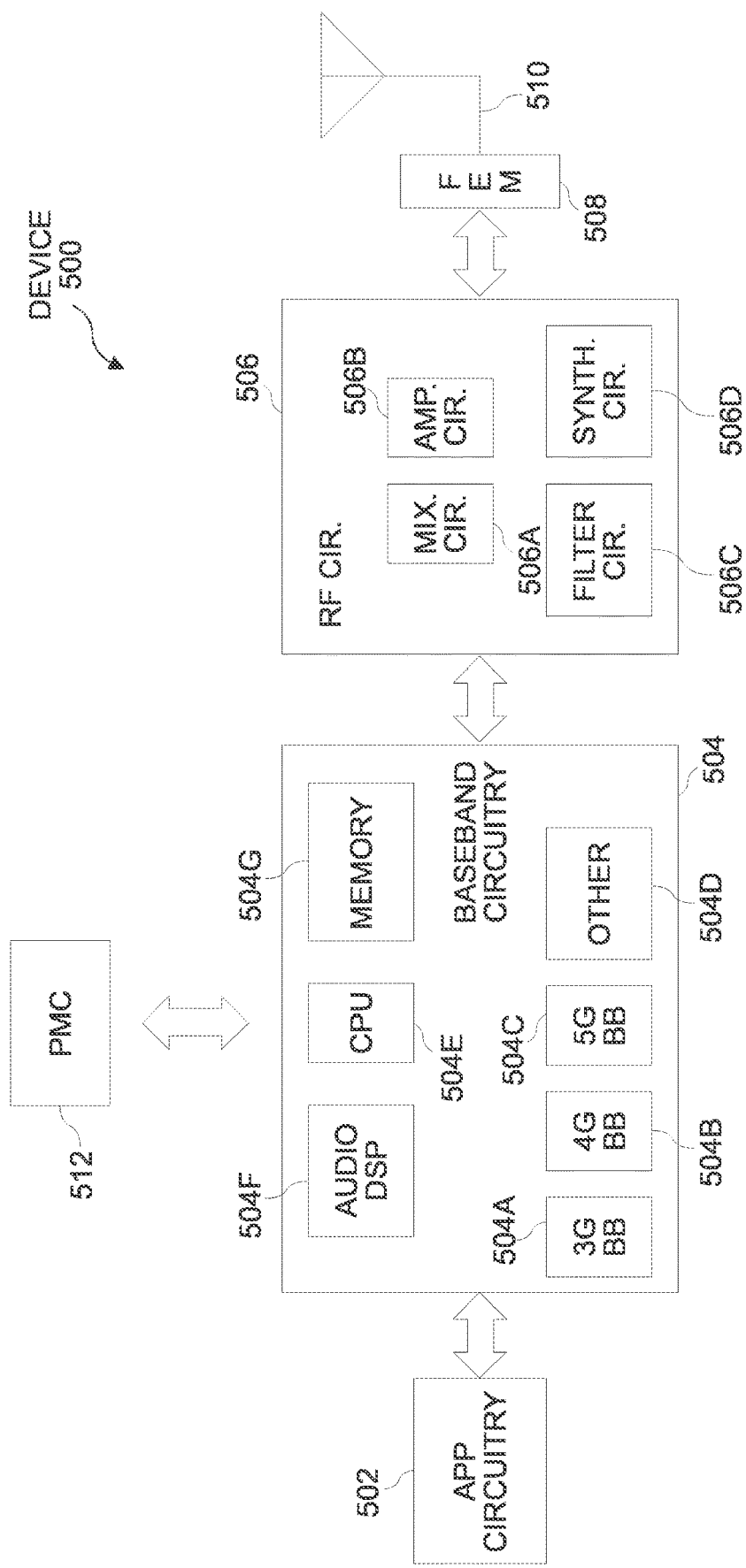
FIG. 5 illustrates example components of a device in accordance with some embodiments.

FIG. 5 illustrates example components of a device 500 in accordance with some embodiments. In some embodiments, the device 500 may include application circuitry 502, baseband circuitry 504, Radio Frequency (RF) circuitry 506, front-end module (FEM) circuitry 508, one or more antennas 510, and power management circuitry (PMC) 512 coupled together at least as shown. The components of the illustrated device 500 may be included in a UE or a RAN node. In some embodiments, the device 500 may include less elements (e.g., a RAN node may not utilize application circuitry 502, and instead include a processor/controller to process IP data received from an EPC). In some embodiments, the device 500 may include additional elements such as, for example, memory/storage, display, camera, sensor, or input/output)I/O(interface. In other embodiments, the components described below may be included in more than one device (e.g., said circuitries may be separately included in more than one device for Cloud-RAN (C-RAN) implementations).

The application circuitry 502 may include one or more application processors. For example, the application circuitry 502 may include circuitry such as, but not limited to, one or more single-core or multi-core processors. The processor)s(may include any combination of general-purpose processors and dedicated processors (e.g., graphics processors, application processors, etc.(. The processors may be coupled with or may include memory/storage and may be configured to execute instructions stored in the memory/ storage to enable various applications or operating systems to run on the device 500. In some embodiments, processors of application circuitry 502 may process IP data packets received from an EPC.

The baseband circuitry 504 may include circuitry such as, but not limited to, one or more single-core or multi-core processors. The baseband circuitry 504 may include one or more baseband processors or control logic to process baseband signals received from a receive signal path of the RF circuitry 506 and to generate baseband signals for a transmit signal path of the RF circuitry 506. Baseband processing circuitry 504 may interface with the application circuitry 502 for generation and processing of the baseband signals and for controlling operations of the RF circuitry 506. For example, in some embodiments, the baseband circuitry 504 may include a third generation (3G) baseband processor 504A, a fourth generation (4G) baseband processor 504B, a fifth generation (5G) baseband processor 504C, or other baseband processor(s) 504D for other existing generations, generations in development or to be developed in the future (e.g., second generation (2G), sixth generation (6G), etc.). The baseband circuitry 504 (e.g., one or more of baseband processors 504A-D) may handle various radio control functions that enable communication with one or more radio networks via the RF circuitry 506. In other embodiments, some or all of the functionality of baseband processors 504A-D may be included in modules stored in the memory 504G and executed via a Central Processing Unit (CPU) 504E. The radio control functions may include, but are not limited to, signal modulation/demodulation, encoding/decoding, radio frequency shifting, etc. In some embodiments, modulation/demodulation circuitry of the baseband circuitry 504 may include Fast-Fourier Transform (FFT), precoding, or constellation mapping/demapping functionality. In some embodiments, encoding/decoding circuitry of the baseband circuitry 504 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 504 may include one or more audio digital signal processor(s) (DSP) 504F. The audio DSP(s) 504F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 504 and the application circuitry 502 may be implemented together such as, for example, on a system on a chip) SOC(.

In some embodiments, the baseband circuitry 504 may provide for communication compatible with one or more radio technologies. For example, in some embodiments, the baseband circuitry 504 may support communication with an evolved universal terrestrial radio access network) EUTRAN (or other wireless metropolitan area networks) WMAN, (a wireless local area network (WLAN), a wireless personal area network (WPAN). Embodiments in which the baseband circuitry 504 is configured to support radio communications of more than one wireless protocol may be referred to as multi-mode baseband circuitry.

RF circuitry 506 may enable communication with wireless networks using modulated electromagnetic radiation through a non-solid medium. In various embodiments, the RF circuitry 506 may include switches, filters, amplifiers, etc. to facilitate the communication with the wireless network. RF circuitry 506 may include a receive signal path which may include circuitry to down-convert RF signals received from the FEM circuitry 508 and provide baseband signals to the baseband circuitry 504. RF circuitry 506 may also include a transmit signal path which may include circuitry to up-convert baseband signals provided by the baseband circuitry 504 and provide RF output signals to the FEM circuitry 508 for transmission.

In some embodiments, the receive signal path of the RF circuitry 506 may include mixer circuitry 506a, amplifier circuitry 506b and filter circuitry 506c. In some embodiments, the transmit signal path of the RF circuitry 506 may include filter circuitry 506c and mixer circuitry 506a. RF circuitry 506 may also include synthesizer circuitry 506d for synthesizing a frequency for use by the mixer circuitry 506a of the receive signal path and the transmit signal path. In some embodiments, the mixer circuitry 506a of the receive signal path may be configured to down-convert RF signals received from the FEM circuitry 508 based on the synthesized frequency provided by synthesizer circuitry 506d. The amplifier circuitry 506b may be configured to amplify the down-converted signals and the filter circuitry 506c may be a low-pass filter (LPF) or band-pass filter (BPF) configured to remove unwanted signals from the down-converted signals to generate output baseband signals. Output baseband signals may be provided to the baseband circuitry 504 for further processing. In some embodiments, the output baseband signals may be zero-frequency baseband signals, although this is not a requirement. In some embodiments, mixer circuitry 506a of the receive signal path may comprise passive mixers, although the scope of the embodiments is not limited in this respect.

In some embodiments, the mixer circuitry 506a of the transmit signal path may be configured to up-convert input baseband signals based on the synthesized frequency provided by the synthesizer circuitry 506d to generate RF output signals for the FEM circuitry 508. The baseband signals may be provided by the baseband circuitry 504 and may be filtered by filter circuitry 506c.

In some embodiments, the mixer circuitry 506a of the receive signal path and the mixer circuitry 506a of the transmit signal path may include two or more mixers and may be arranged for quadrature down-conversion and up-conversion, respectively. In some embodiments, the mixer circuitry 506a of the receive signal path and the mixer circuitry 506a of the transmit signal path may include two or more mixers and may be arranged for image rejection (e.g., Hartley image rejection). In some embodiments, the mixer circuitry 506a of the receive signal path and the mixer circuitry 506a may be arranged for direct down-conversion and direct up-conversion, respectively. In some embodiments, the mixer circuitry 506a of the receive signal path and the mixer circuitry 506a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 506 may include analog-to-digital converter (ADC) and digital-to-analog converter (DAC) circuitry and the baseband circuitry 504 may include a digital baseband interface to communicate with the RF circuitry 506.

In some dual-mode embodiments, a separate radio IC circuitry may be provided for processing signals for each spectrum, although the scope of the embodiments is not limited in this respect.

In some embodiments, the synthesizer circuitry 506d may be a fractional-N synthesizer or a fractional N/N+1 synthesizer, although the scope of the embodiments is not limited in this respect as other types of frequency synthesizers may be suitable. For example, synthesizer circuitry 506d may be a delta-sigma synthesizer, a frequency multiplier, or a synthesizer comprising a phase-locked loop with a frequency divider.

The synthesizer circuitry 506d may be configured to synthesize an output frequency for use by the mixer circuitry 506a of the RF circuitry 506 based on a frequency input and a divider control input. In some embodiments, the synthesizer circuitry 506d may be a fractional N/N+1 synthesizer.

In some embodiments, frequency input may be provided by a voltage-controlled oscillator (VCO), although that is not a requirement. Divider control input may be provided by either the baseband circuitry 504 or the applications processor 502 depending on the desired output frequency. In some embodiments, a divider control input (e.g., N) may be determined from a look-up table based on a channel indicated by the applications processor 502.

Synthesizer circuitry 506d of the RF circuitry 506 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 506d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLo). In some embodiments, the RF circuitry 506 may include an IQ/polar converter.

FEM circuitry 508 may include a receive signal path which may include circuitry configured to operate on RF signals received from one or more antennas 510, amplify the received signals and provide the amplified versions of the received signals to the RF circuitry 506 for further processing. FEM circuitry 508 may also include a transmit signal path which may include circuitry configured to amplify signals for transmission provided by the RF circuitry 506 for transmission by one or more of the one or more antennas 510. In various embodiments, the amplification through the transmit or receive signal paths may be done solely in the RF circuitry 506, solely in the FEM 508, or in both the RF circuitry 506 and the FEM 508.

In some embodiments, the FEM circuitry 508 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 506). The transmit signal path of the FEM circuitry 508 may include a power amplifier (PA) to amplify input RF signals (e.g., provided by RF circuitry 506), and one or more filters to generate RF signals for subsequent transmission (e.g., by one or more of the one or more antennas 510).

In some embodiments, the PMC 512 may manage power provided to the baseband circuitry 504. In particular, the PMC 512 may control power-source selection, voltage scaling, battery charging, or DC-to-DC conversion. The PMC 512 may often be included when the device 500 is capable of being powered by a battery, for example, when the device is included in a UE. The PMC 512 may increase the power conversion efficiency while providing desirable implementation size and heat dissipation characteristics.

While FIG. 5 shows the PMC 512 coupled only with the baseband circuitry 504. However, in other embodiments, the PMC 5 12 may be additionally or alternatively coupled with, and perform similar power management operations for, other components such as, but not limited to, application circuitry 502, RF circuitry 506, or FEM 508.

In some embodiments, the PMC 512 may control, or otherwise be part of, various power saving mechanisms of the device 500. For example, if the device 500 is in an RRC Connected state, where it is still connected to the RAN node as it expects to receive traffic shortly, then it may enter a state known as Discontinuous Reception Mode (DRX) after a period of inactivity. During this state, the device 500 may power down for brief intervals of time and thus save power.

If there is no data traffic activity for an extended period of time, then the device 500 may transition off to an RRC_Idle state, where it disconnects from the network and does not perform operations such as channel quality feedback, handover, etc. The device 500 goes into a very low power state and it performs paging where again it periodically wakes up to listen to the network and then powers down again. The device 500 may not receive data in this state, in order to receive data, it must transition back to RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 502 and processors of the baseband circuitry 504 may be used to execute elements of one or more instances of a protocol stack. For example, processors of the baseband circuitry 504, alone or in combination, may be used execute Layer 3, Layer 2, or Layer 1 functionality, while processors of the application circuitry 504 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 6:
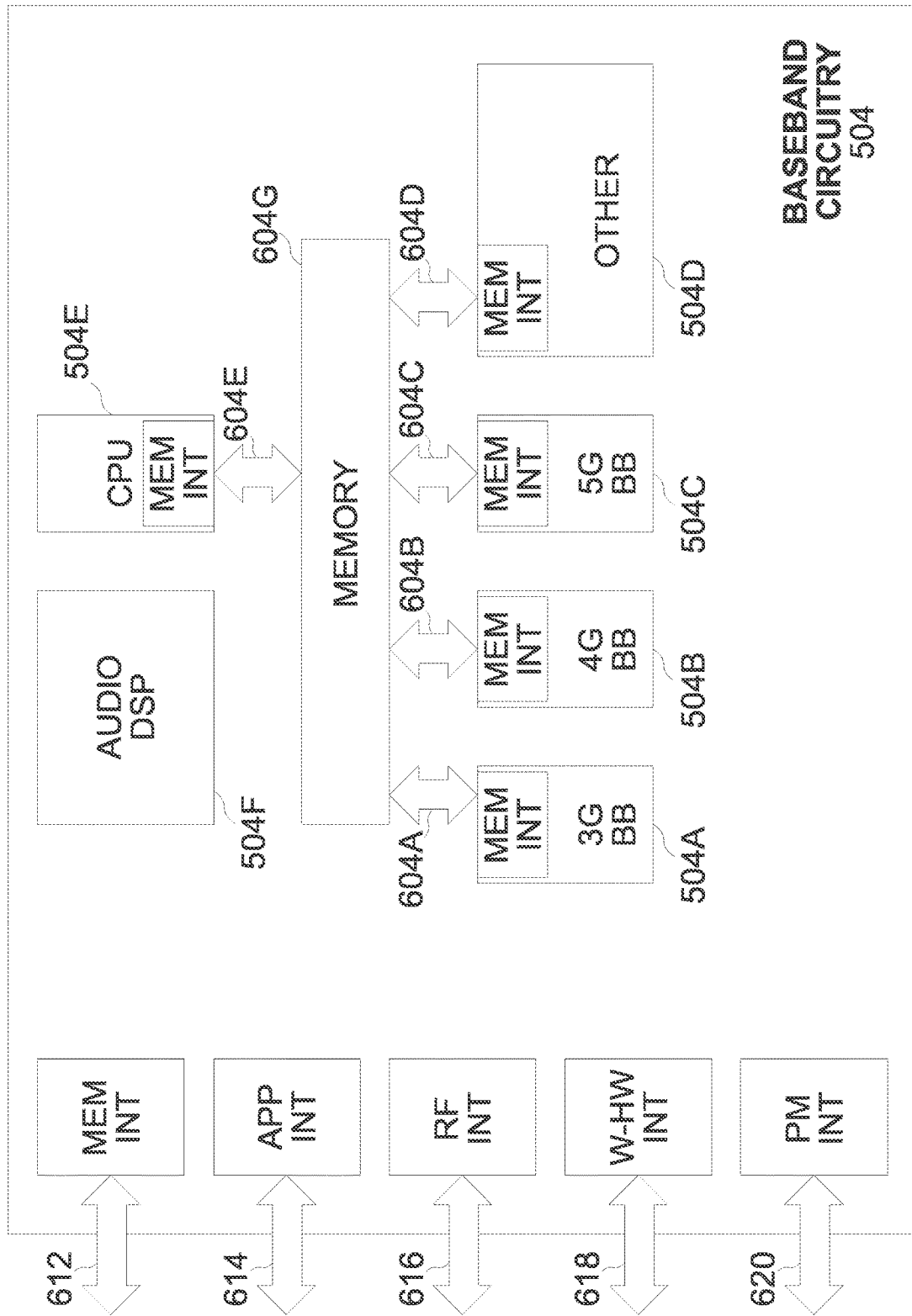
FIG. 6 illustrates example interfaces of baseband circuitry in accordance with some embodiments.

FIG. 6 illustrates example interfaces of baseband circuitry in accordance with some embodiments. As discussed above, the baseband circuitry 504 of FIG. 5 may comprise processors 504A-504E and a memory 504G utilized by said processors. Each of the processors 504A-504E may include a memory interface, 604A-604E, respectively, to send/receive data to/from the memory 504G.

The baseband circuitry 504 may further include one or more interfaces to communicatively couple to other circuitries/devices, such as a memory interface 612 (e.g., an interface to send/receive data to/from memory external to the baseband circuitry XT04), an application circuitry interface 614 (e.g., an interface to send/receive data to/from the application circuitry XT02 of FIG. XT), an RF circuitry interface 616 (e.g., an interface to send/receive data to/from RF circuitry XT06 of FIG. XT), a wireless hardware connectivity interface 618 (e.g., an interface to send/receive data to/from Near Field Communication (NFC) components, Bluetooth® components (e.g., Bluetooth® Low Energy), Wi-Fi® components, and other communication components), and a power management interface 620 (e.g., an interface to send/receive power or control signals to/from the PMC XT12.

Figure 7:
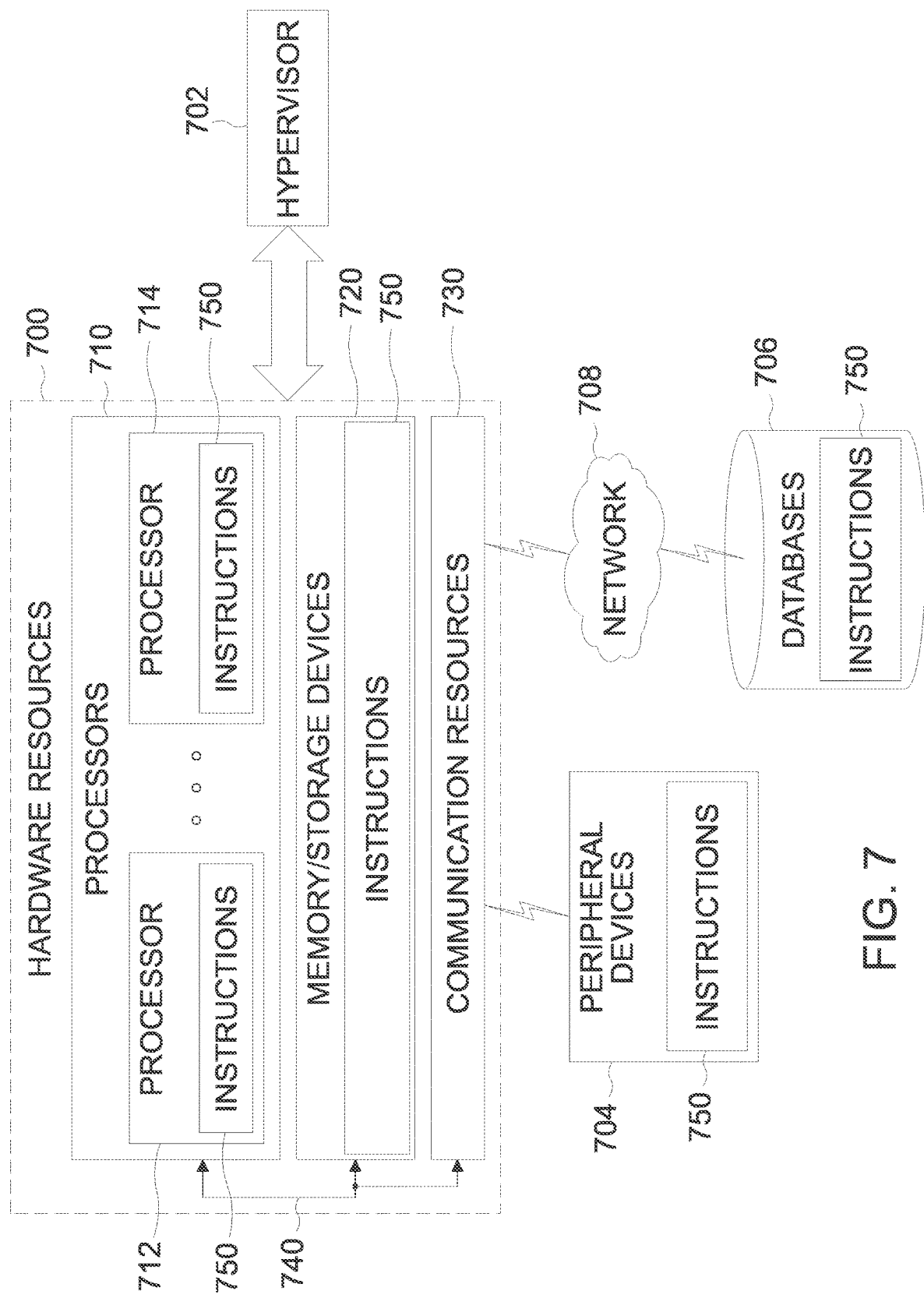
FIG. 7 is a block diagram illustrating exemplary components, according to some example embodiments, able to read instructions from a machine-readable or computer-readable medium and perform any one or more of the methodologies discussed herein.

FIG. 7 is a block diagram illustrating exemplary components, according to some example embodiments, able to read instructions from a machine-readable or computer-readable medium (e.g., a non-transitory machine-readable storage medium) and perform any one or more of the methodologies discussed herein. Specifically, FIG. 7 shows a diagrammatic representation of hardware resources 700 including one or more processors (or processor cores) 710, one or more memory/storage devices 720, and one or more communication resources 730, each of which may be communicatively coupled via a bus 740. For embodiments where node virtualization (e.g., NFV) is utilized, a hypervisor 702 may be executed to provide an execution environment for one or more network slices/sub-slices to utilize the hardware resources 700

The processors 710 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 712 and a processor 714.

The memory/storage devices 720 may include cloud-base storage element, main memory, disk storage, or any suitable combination thereof. The memory/storage devices 720 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 730 may include interconnection or network interface components or other suitable devices to communicate with one or more peripheral devices 704 or one or more databases 706 via a network 708. For example, the communication resources 730 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 750 may comprise software, a program, an application, an applet, an app, or other executable code for causing at least any of the processors 710 to perform any one or more of the methodologies discussed herein. The instructions 750 may reside, completely or partially, within at least one of the processors 710 (e.g., within the processor's cache memory), the memory/storage devices 720, or any suitable combination thereof. Furthermore, any portion of the instructions 750 may be transferred to the hardware resources 700 from any combination of the peripheral devices 704 or the databases 706. Accordingly, the memory of processors 710, the memory/storage devices 720, the peripheral devices 704, and the databases 706 are examples of computer-readable and machine-readable media.

Another example is a computer program having a program code for performing at least one of the methods described herein, when the computer program is executed on a computer, a processor, or a programmable hardware component. Another example is a machine-readable storage including machine readable instructions, when executed, to implement a method or realize an apparatus as described herein. A further example is a machine-readable medium including code, when executed, to cause a machine to perform any of the methods described herein.

The examples as described herein may be summarized as follows:

Example 1 is an apparatus for wireless transmission and reception. The apparatus includes an RF circuitry configured to transmit and receive a signal in an RF frequency, a baseband circuitry configured to process a transmit signal or a receive signal in a baseband frequency, and a conversion circuitry configured to interface between the baseband circuitry and the RF circuitry. The conversion circuitry is configured to convert a baseband signal received from the baseband circuitry to an RF signal in a first RF frequency if a transmit frequency is a second RF frequency or to the RF signal in the second RF frequency if the transmit frequency is the first RF frequency, and send the RF signal after frequency conversion to the RF circuitry. The RF circuitry is configured to convert the RF signal to the transmit frequency for transmission.

Example 2 is the apparatus of example 1, wherein the conversion circuitry includes a local oscillator circuitry configured to generate a local oscillator signal in a frequency that is a difference between the first RF frequency and the second RF frequency, and the conversion circuitry is configured to send the local oscillator signal to the RF circuitry along with the RF signal after frequency conversion.

Example 3 is the apparatus as in any one of examples 1-2, wherein the RF circuitry is configured to convert a second RF signal received via an antenna to an RF signal in the second RF frequency if a receive frequency of the second RF signal is the first RF frequency or to an RF signal in the first RF frequency if the receive frequency is the second RF frequency, and send the second RF signal after frequency conversion to the conversion circuitry.

Example 4 is the apparatus as in any one of examples 1-3, wherein the RF circuitry and the conversion circuitry are connected via a single conductor.

Example 5 is the apparatus as in any one of examples 1-4, wherein the first frequency is substantially in a 24.25-29.5 GHz band and the second frequency is substantially in a 37.01-43.5 GHz band.

Example 6 is the apparatus as in any one of examples 1-5, wherein the RF circuitry and the conversion circuitry are separate integrated circuit chips.

Example 7 is a circuitry for operating with an RF circuitry. The circuitry includes a mixer configured to mix a baseband signal received from a baseband circuitry with a local oscillator signal to convert the baseband signal to an RF signal, and a filter configured to filter an output from the mixer. The mixer is configured to convert the baseband signal to an RF signal in a first RF frequency if a transmit frequency is a second RF frequency or to the RF signal in a second RF frequency if the transmit frequency is the first RF frequency.

Example 8 is the circuitry of example 7, further including a local oscillator circuitry configured to generate a local oscillator signal in a frequency that is a difference between the first RF frequency and the second RF frequency.

Example 9 is the circuitry of example 8, wherein the local oscillator signal and the RF signal are multiplexed onto a single conductor.

Example 10 is the circuitry as in any one of examples 7-9, wherein the first frequency is substantially in a 24.25-29.5 GHz band and the second frequency is substantially in a 37.01-43.5 GHz band.

Example 11 is a method for operating with an RF circuitry comprising generating, by a baseband circuitry, a baseband signal in a baseband frequency, converting, by a conversion circuitry, the baseband signal to an RF signal, wherein the baseband signal is converted to the RF signal in a first RF frequency if a transmit frequency is a second RF frequency and to the RF signal in the second RF frequency if the transmit frequency is the first RF frequency, and sending the RF signal after frequency conversion to an RF circuitry, and converting, by the RF circuitry, the RF signal to the transmit frequency and transmitting the RF signal.

Example 12 is the method of example 11, further comprising sending, by the conversion circuitry, to the RF circuitry a local oscillator signal in a frequency that is a difference between the first RF frequency and the second RF frequency.

Example 13 is the method as in any one of examples 11-12, further comprising receiving, by the RF circuitry, a second RF signal via an antenna, converting, by the RF circuitry, the second RF signal to an RF signal in the second RF frequency if a receive frequency is the first RF frequency or to an RF signal in the first RF frequency if the receive frequency is the second RF frequency, and sending, by the RF circuitry, the second RF signal after frequency conversion to the conversion circuitry.

Example 14 is the method as in any one of examples 11-13, wherein the RF circuitry and the conversion circuitry are connected via a single conductor.

Example 15 is the method as in any one of examples 11-14, wherein the first frequency is substantially in a 24.25-29.5 GHz band and the second frequency is substantially in a 37.01-43.5 GHz band.

Example 16 is the method as in any one of examples 11-15, wherein the RF circuitry and the conversion circuitry are separate integrated circuit chips.

Example 17 is a machine-readable medium including code, when executed, to cause a machine to perform a method as in any one of examples 11-16.

The aspects and features mentioned and described together with one or more of the previously detailed examples and figures, may as well be combined with one or more of the other examples in order to replace a like feature of the other example or in order to additionally introduce the feature to the other example.

Examples may further be or relate to a computer program having a program code for performing one or more of the above methods, when the computer program is executed on a computer or processor. Steps, operations or processes of various above-described methods may be performed by programmed computers or processors. Examples may also cover program storage devices such as digital data storage media, which are machine, processor or computer readable and encode machine-executable, processor-executable or computer-executable programs of instructions. The instructions perform or cause performing some or all of the acts of the above-described methods. The program storage devices may comprise or be, for instance, digital memories, magnetic storage media such as magnetic disks and magnetic tapes, hard drives, or optically readable digital data storage media. Further examples may also cover computers, processors or control units programmed to perform the acts of the above-described methods or (field) programmable logic arrays ((F)PLAs) or (field) programmable gate arrays ((F)PGAs), programmed to perform the acts of the above-described methods.

The description and drawings merely illustrate the principles of the disclosure. Furthermore, all examples recited herein are principally intended expressly to be only for pedagogical purposes to aid the reader in understanding the principles of the disclosure and the concepts contributed by the inventor(s) to furthering the art. All statements herein reciting principles, aspects, and examples of the disclosure, as well as specific examples thereof, are intended to encompass equivalents thereof.

A functional block denoted as "means for . . . " performing a certain function may refer to a circuit that is configured to perform a certain function. Hence, a "means for s.th." may be implemented as a "means configured to or suited for s.th.", such as a device or a circuit configured to or suited for the respective task.

Functions of various elements shown in the figures, including any functional blocks labeled as "means", "means for providing a sensor signal", "means for generating a transmit signal.", etc., may be implemented in the form of dedicated hardware, such as "a signal provider", "a signal processing unit", "a processor", "a controller", etc. as well as hardware capable of executing software in association with appropriate software. When provided by a processor, the functions may be provided by a single dedicated processor, by a single shared processor, or by a plurality of individual processors, some of which or all of which may be shared. However, the term "processor" or "controller" is by far not limited to hardware exclusively capable of executing software but may include digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

A block diagram may, for instance, illustrate a high-level circuit diagram implementing the principles of the disclosure. Similarly, a flow chart, a flow diagram, a state transition diagram, a pseudo code, and the like may represent various processes, operations or steps, which may, for instance, be substantially represented in computer readable medium and so executed by a computer or processor, whether or not such computer or processor is explicitly shown. Methods disclosed in the specification or in the claims may be implemented by a device having means for performing each of the respective acts of these methods.

It is to be understood that the disclosure of multiple acts, processes, operations, steps or functions disclosed in the specification or claims may not be construed as to be within the specific order, unless explicitly or implicitly stated otherwise, for instance for technical reasons. Therefore, the disclosure of multiple acts or functions will not limit these to a particular order unless such acts or functions are not interchangeable for technical reasons. Furthermore, in some examples a single act, function, process, operation or step may include or may be broken into multiple sub-acts, -functions, -processes, -operations or -steps, respectively. Such sub acts may be included and part of the disclosure of this single act unless explicitly excluded.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are explicitly proposed herein unless it is stated that a specific combination is not intended. Furthermore, it is intended to include also features of a claim to any other independent claim even if this claim is not directly made dependent to the independent claim.

What is claimed is:

1. An apparatus for wireless transmission and reception, comprising:
   a radio frequency (RF) circuitry configured to transmit and receive a signal in an RF frequency;
   a baseband circuitry configured to process a transmit signal or a receive signal in a baseband frequency; and
   a conversion circuitry configured to interface between the baseband circuitry and the RF circuitry,
   wherein the conversion circuitry is configured to convert a baseband signal received from the baseband circuitry to an RF signal in a first RF frequency if a transmit frequency is a second RF frequency and convert the baseband signal to an RF signal in the second RF frequency if the transmit frequency is the first RF frequency, and send the RF signal after frequency conversion to the RF circuitry,
   wherein the RF circuitry is configured to convert the RF signal to the transmit frequency for transmission.

2. The apparatus of claim 1, wherein the conversion circuitry includes a local oscillator circuitry configured to generate a local oscillator signal in a frequency that is a difference between the first RF frequency and the second RF frequency, and the conversion circuitry is configured to send the local oscillator signal to the RF circuitry along with the RF signal after frequency conversion.

3. The apparatus of claim 1, wherein the RF circuitry is configured to convert a second RF signal received via an antenna to an RF signal in the second RF frequency if a receive frequency of the second RF signal is the first RF frequency or to an RF signal in the first RF frequency if the receive frequency is the second RF frequency, and send the second RF signal after frequency conversion to the conversion circuitry.

4. The apparatus of claim 1, wherein the RF circuitry and the conversion circuitry are connected via a single conductor.

5. The apparatus of claim 1, wherein the first frequency is substantially in a 24.25-29.5 GHz band and the second frequency is substantially in a 37.01-43.5 GHz band.

6. The apparatus of claim 1, wherein the RF circuitry and the conversion circuitry are separate integrated circuit chips.

7. A circuitry for operating with a radio frequency (RF) circuitry, comprising:
   a mixer configured to mix a baseband signal received from a baseband circuitry with a local oscillator signal to convert the baseband signal to an RF signal, wherein the mixer is configured to convert the baseband signal to an RF signal in a first RF frequency if a transmit frequency is a second RF frequency and convert the baseband signal to an RF signal in a second RF frequency if the transmit frequency is the first RF frequency; and
   a filter configured to filter an output from the mixer.

8. The circuitry of claim 7, further comprising a local oscillator circuitry configured to generate a local oscillator signal in a frequency that is a difference between the first RF frequency and the second RF frequency.

9. The circuitry of claim 8, wherein the local oscillator signal and the RF signal are multiplexed onto a single conductor.

10. The circuitry of claim 7, wherein the first frequency is substantially in a 24.25-29.5 GHz band and the second frequency is substantially in a 37.01-43.5 GHz band.

11. A method for operating with a radio frequency (RF) circuitry, comprising:
    generating, by a baseband circuitry, a baseband signal in a baseband frequency;
    converting, by a conversion circuitry, the baseband signal to an RF signal, wherein the baseband signal is converted to the RF signal in a first RF frequency if a transmit frequency is a second RF frequency and to the RF signal in the second RF frequency if the transmit frequency is the first RF frequency, and sending the RF signal after frequency conversion to an RF circuitry; and
    converting, by the RF circuitry, the RF signal to the transmit frequency and transmitting the RF signal.

12. The method of claim 11, further comprising:
    sending, by the conversion circuitry, to the RF circuitry a local oscillator signal in a frequency that is a difference between the first RF frequency and the second RF frequency.

13. The method of claim 11, further comprising:
    receiving, by the RF circuitry, a second RF signal via an antenna;
    converting, by the RF circuitry, the second RF signal to an RF signal in the second RF frequency if a receive frequency is the first RF frequency or to an RF signal in the first RF frequency if the receive frequency is the second RF frequency; and
    sending, by the RF circuitry, the second RF signal after frequency conversion to the conversion circuitry.

14. The method of claim 11, wherein the RF circuitry and the conversion circuitry are connected via a single conductor.

15. The method of claim 11, wherein the first frequency is substantially in a 24.25-29.5 GHz band and the second frequency is substantially in a 37.01-43.5 GHz band.

16. The method of claim 11, wherein the RF circuitry and the conversion circuitry are separate integrated circuit chips.

17. A non-transitory machine-readable medium including code, when executed, to cause a machine to perform a method of claim 11.

\* \* \* \* \*